United States Patent [19]
Konstantinides

[11] Patent Number: 5,508,949
[45] Date of Patent: Apr. 16, 1996

[54] FAST SUBBAND FILTERING IN DIGITAL SIGNAL CODING

[75] Inventor: Konstantinos Konstantinides, San Jose, Calif.

[73] Assignee: Hewlett-Packard Company, Palo Alto, Calif.

[21] Appl. No.: 174,747

[22] Filed: Dec. 29, 1993

[51] Int. Cl.$^6$ .................................................. H03M 13/00
[52] U.S. Cl. ..................... 364/725; 364/514 A; 348/415; 395/2; 395/2.12
[58] Field of Search ..................... 364/514, 725, 364/572, 574; 348/415, 416; 395/2, 2.12; 381/29, 30

[56] References Cited

U.S. PATENT DOCUMENTS

| | | | |
|---|---|---|---|
| 4,302,775 | 11/1981 | Widergren et al. | 364/514 |
| 4,394,774 | 7/1983 | Widergren et al. | 364/514 |
| 4,825,285 | 4/1989 | Speidel et al. | 364/725 |
| 4,897,717 | 1/1990 | Hamilton et al. | 364/514 |
| 5,029,122 | 7/1991 | Uetani | 364/725 |
| 5,134,477 | 7/1992 | Knauer et al. | 348/416 |
| 5,202,847 | 4/1993 | Bolton et al. | 364/725 |
| 5,230,038 | 7/1993 | Fielder et al. | 395/2 |
| 5,249,146 | 9/1993 | Uramoto et al. | 364/725 |
| 5,253,058 | 10/1993 | Gharavi | 348/415 |
| 5,297,236 | 3/1994 | Antill et al. | 395/2.12 |

OTHER PUBLICATIONS

B. G. Lee, A New Algorithm To Compute The Discrete Cosine Transform, IEEE Trans. on ASSP, vol. ASSP-32, No. 6, pp. 1243–1245, Dec. 1984.
H. Musmann, The ISO Audio Coding Standard, IEEE GLOBECOM Conference, pp. 511–517, San Diego, CA 1990.

Primary Examiner—Ellis B. Ramirez
Assistant Examiner—Craig Steven Miller

[57] ABSTRACT

A coding system for data compression and decompression of a digitized source signal, for example in accordance with the MPEG audio standard, includes an analysis filter in which an inverse discrete cosine transform operation is employed during data encoding, and a synthesis filter in which a discrete cosine transform is performed during data decoding.

8 Claims, 9 Drawing Sheets

FAST SUBBAND FILTERING IN DIGITAL SIGNAL CODING

BACKGROUND OF THE INVENTION

1. Technical Field

The present invention relates to data coding. More particularly, the present invention relates to subband filtering during data encoding and decoding.

2. Description of the Prior Art

Even though modern storage media allow vast quantities of information to be stored in a minimal amount of physical space, it is still desirable to use coding techniques to effect data compression. In this way stored materials may be presented in a variety of convenient standard formats.

Decoding such coded materials requires that the stored materials be reconstructed by application of various decompression techniques. Such reconstruction is compute intensive, must be reliable, and must take place fast enough, for example in the case of audio and video information, to allow real time presentation of the stored materials. Additionally, the decode process must not require excessive or expensive hardware to meet the requirements of speed and accuracy.

The coding format chosen can make considerable difference in meeting the twin goals of speed and accuracy. The format used to code digital audio and video signals for storage and retrieval is dictated by various standards. For example, the Motion Picture Expert Group (MPEG) has established a standard for audio and video coding. The MPEG audio coding standard provides high quality audio using reduced bit rates of 128 kbit/s per audio channel instead of the 706 kbit/s required in uncompressed Compact Disc® quality audio. See ISO/IEC 11172-3, "Coding of moving pictures and associated audio for digital storage media at up to about 1.5 Mbit/s—Part 3: Audio, "ISO/IEC JTC 1/SC29, May 20, 1993; and H. Musmann, *The ISO Audio Coding Standard*, IEEE GLOBECOM Conference, pp. 511–517, San Diego, Calif. 1990.

In the MPEG audio coding standard, a digital audio signal is encoded to produce a compressed bitstream for storage on any desired medium, e.g. compact disk, tape, etc. During MPEG audio encoding a nonstandard encoding technique may be used for such tasks as estimation of the auditory masking threshold, quantization, and/or scaling. The MPEG standard requires that the encoded signal must be such that a decoder conforming the specifications of the standard can produce audio suitable for the intended application from such encoded signal.

While significant effort has been spent in improving the video decoding and display techniques for MPEG files, very little effort has gone into improving the speed and efficiency of MPEG audio coding. As a result, audio decoding initially represented more than 40% of the overall decoding time. Various improvements have been made to MPEG audio decoding, such that decoding the audio portion of an MPEG coded video sequence amounts to 33% of the overall decoding time; while video coding amounts to 55% of the overall decoding time, and synchronization amounts to 12% of the overall decoding time. Fast execution of the MPEG standard is very important for real-time or close to real-time encoding and decoding in most applications where the use of special hardware would make the application of such technology too expensive.

Subband filtering is one of the most compute intensive operations in the MPEG audio coding standard and therefore an area of critical concern in improving coding performance for audio materials. One especially compute intensive operation of subband filtering is the matrixing operation. Matrixing is presently accomplished by brute force computation. That is, in the MPEG standard for audio $32 \times 64 = 2,048$ multiply-accumulate operations must be performed. Performing these calculations while still meeting the requirements of speed and accuracy adds significant complexity and expense to the design of the hardware that implements these functions.

SUMMARY OF THE INVENTION

The present invention provides a method and apparatus for fast subband filtering in MPEG audio coding. During the encoding process, a digitized audio signal is preprocessed. The preprocessed signal is presented to the encoder where the matrixing operation in the audio encoding subband analysis filter is accomplished using an inverse discrete cosine transform function ("IDCT"). The IDCT allows the matrixing operation to be carried out using 80 multiplication and 209 addition operations. The encoded material is stored.

During decode of the stored material, the stored bitstream is post processed before decoding by the audio decoding subband synthesis filter. The matrixing operation of the decoding subband filter employs a discrete cosine transform ("DCT") operation.

The invention provides significant speed-up in the MPEG audio coding and decoding process. In MPEG decoding, the invention provides about a 30% improvement in audio decoding and about a 17% improvement overall in combined audio and video decoding, without requiring special hardware.

DETAILED DESCRIPTION OF THE INVENTION

The present invention provides faster coding for MPEG audio. The MPEG audio coding standard allows the sampling bit rate of a stereo sound signal to be reduced from $2 \times 706$ kbit/s, which is the sampling rate for compact disc stereo, to $2 \times 128$ kbit/s. Such coding greatly improves storage capacity of a storage medium, such as a compact disc, allowing, for example up to five times the amount of music to be stored as is currently possible. It has been found that application of the invention to MPEG audio coding provides about a 30% improvement in audio decoding and about a 17% improvement overall in combined audio and video decoding, without requiring special hardware.

Figure 1:
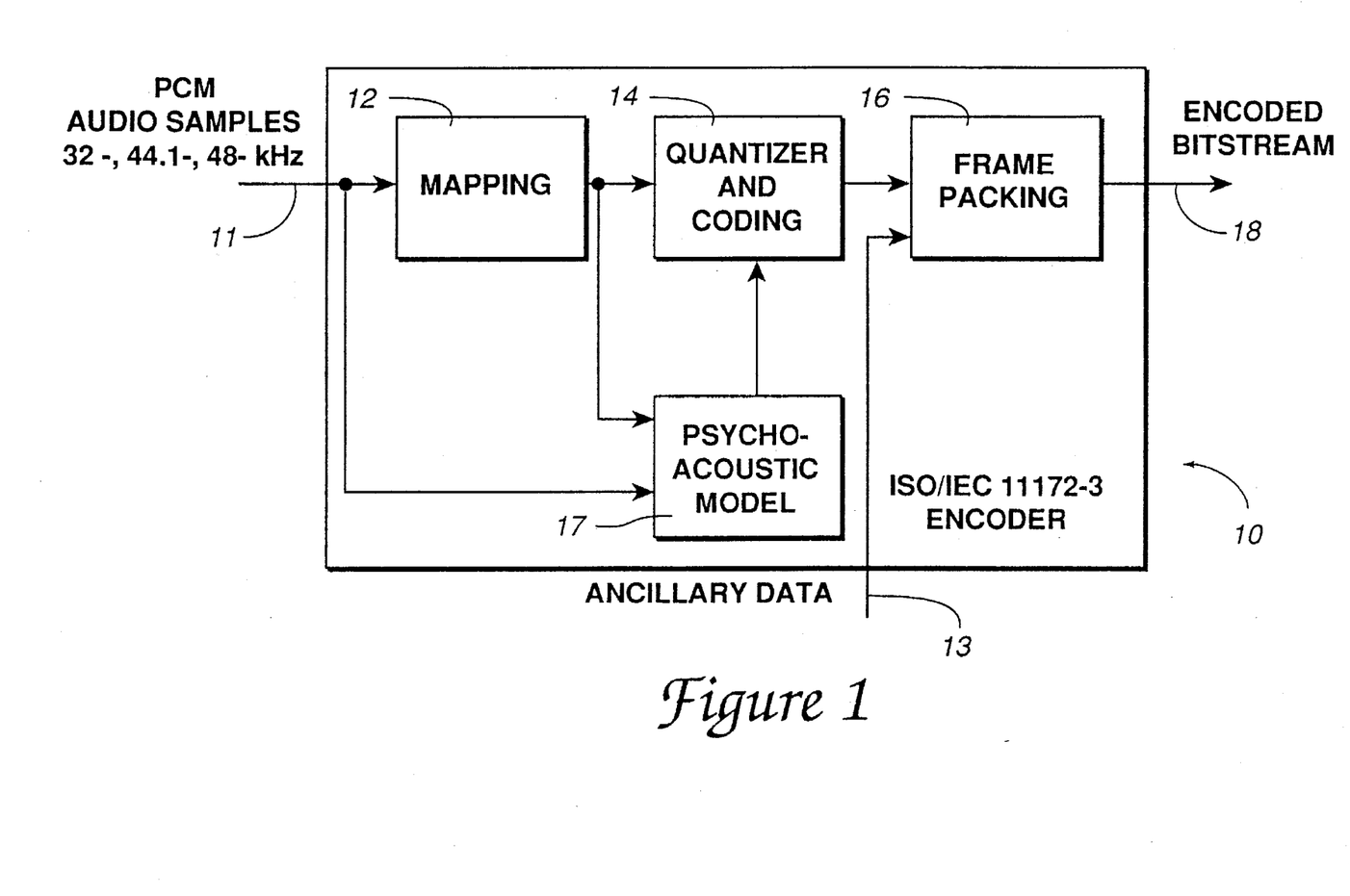
FIG. 1 is a block level schematic diagram of an MPEG audio encoder circuit.

The MPEG audio coding standard will be discussed briefly. FIG. 1 is a block level schematic diagram of an MPEG audio encoder circuit 10. In the figure, an input signal 11, consisting of a pulse code modulated signal having a 48 kHz sampling frequency and a sample size of 16 bits per sample, is provided to a single channel encoder 10. The signal is first mapped from the time domain into the frequency domain by a subband filter bank 12. The resulting coefficients are normalized with scale factors which typically are transmitted as side information. The coefficients thus obtained are then quantized and entropy encoded by a quantizer and encoding circuit 14. Masking thresholds of the quantization errors are calculated based on psychoacoustic values provided by a psychoacoustic model 19 to control the quantization step. The bit allocation to the coefficients is derived from the masking coefficients. This bit allocation information selects one quantizer out of a set of possible quantizers. The bit allocation is transmitted as side information. The coded signal, along with ancillary data 13, is then multiplexed by a frame packing circuit 16 and an encode bitstream 18 is produced at the output of the encoder 10.

Figure 2:
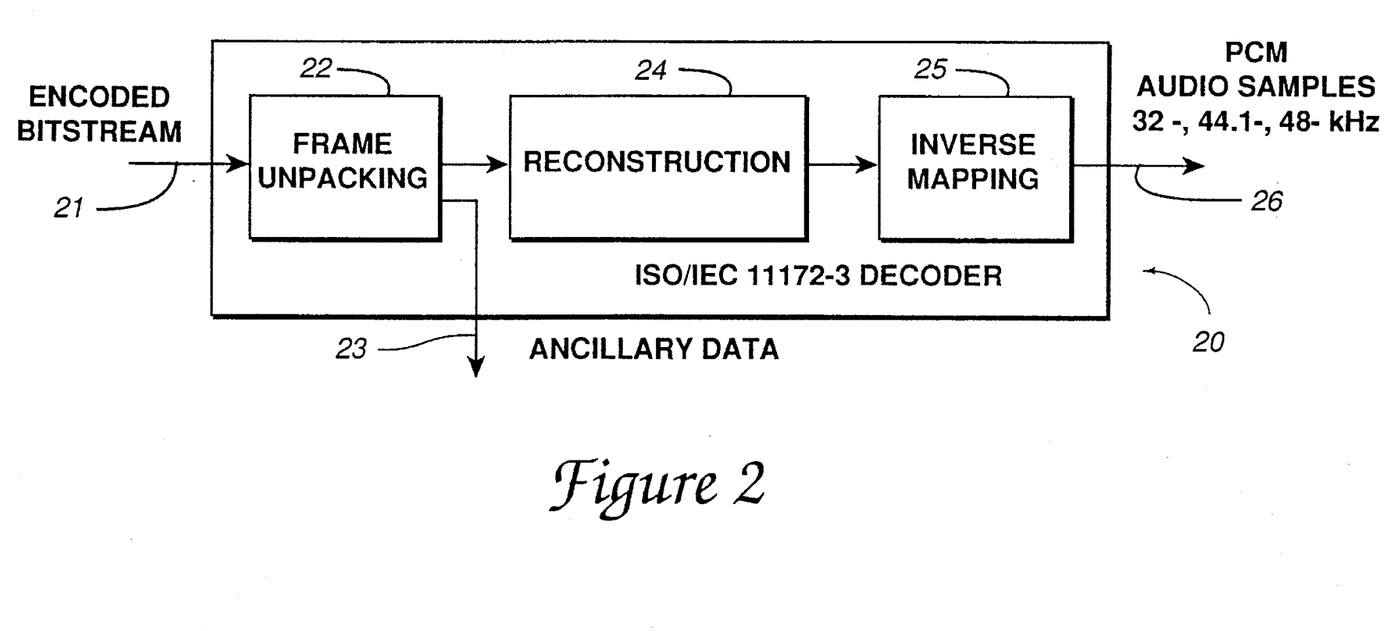
FIG. 2 is a block level schematic diagram of an MPEG audio decoder circuit.

FIG. 2 is a block level schematic diagram of an MPEG audio decoder circuit 20. In the figure, an encoded bitstream 21 is provided to the input of the decoder. A bitstream unpacking and decoding circuit 22 performs an error correction operation if such operation was applied in the encoder. The bitstream data are unpacked to recover the various pieces of encoded information, as well as previously encoded ancillary data 23. A reconstruction circuit 24 reconstructs the quantized version of the set of mapped samples. An inverse mapping circuit 25 transforms the mapped sampled back into a uniform pulse code modulated output signal 26 that corresponds to the input signal to the encoder.

The foregoing descriptions of the encoder and decoder are specific to the MPEG standard. As such, it is considered to be within the skill of those in the art to implement the various hardware functions described above. Accordingly, a more detailed hardware description of an MPEG coding system is not considered necessary for a full and complete understanding of the invention. It should be appreciated the invention described herein, although described in connection with the MPEG coding standard, is considered useful for other coding applications and standards.

Figure 3:
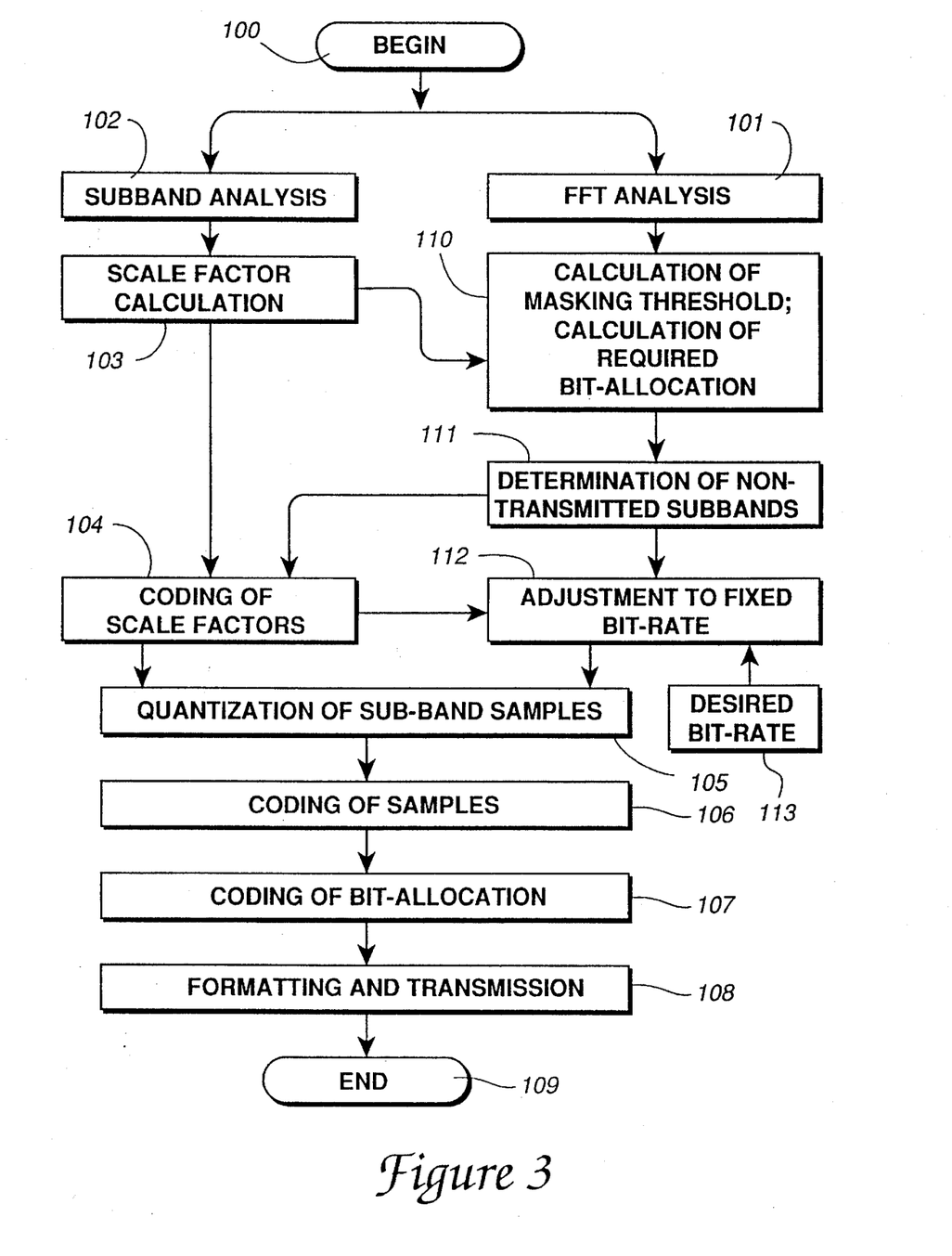
FIG. 3 is a flow diagram showing signal processing in layers I and II in an MPEG audio encoder.

FIG. 3 is a flow diagram showing signal processing in layers I and II in an MPEG audio encoder. A pulse code modulated audio signal is provided to the MPEG encoder (100). The MPEG audio standard uses a subband analysis filter (102) having thirty-two equally spaced subbands to map the input samples into frequency coefficients. As a result of decimation at the output of the subband filters, the output sampling rate of each filter is 1/32 of the input sampling rate. The subband filters are finite impulse response filters of length 512 and are adapted to provide aliasing cancellation.

A scale factor (103) is transmitted for every twelve consecutive output samples of each subband filter. The scale factor corresponds to the maximum absolute value of the twelve samples and is represented by six bits. With entropy coding, a data rate of 8 kbit/s is required for transmitting the scale factors (104).

Parallel to the subband filtering operation, a 1024-point fast Fourier transform of the input sound signal is calculated (101) to obtain a high resolution estimate of the power spectrum. The power spectrum is analyzed to determine the masking thresholds (110). Accordingly, the MPEG standard considers tonal, non-tonal, and quiet signal components individually to compute the masking threshold and the signal-to-mask ratio (SMR) in each subband (111). Bit allocation is an iterative procedure (112, 113). In each iteration step, the number of quantizing levels and, correspondingly, the signal-to-quantizing noise ratio (SNR) is increased (105) by defined increments in subbands where the mask-to-quantizing ratio (MNR)

$$MNR = SNR - SMR$$

is minimum. At the same time, the remaining bits for coding the frame are calculated (106). The iteration procedure is repeated as long as there are remaining bits. The bit allocation information (107) is transmitted every 24 ms, therefore requiring a data rate of 3.5 kbit/s (108). An encoded bitstream is output by the encoder (109) for storage, additional processing, etc.

Figure 4:
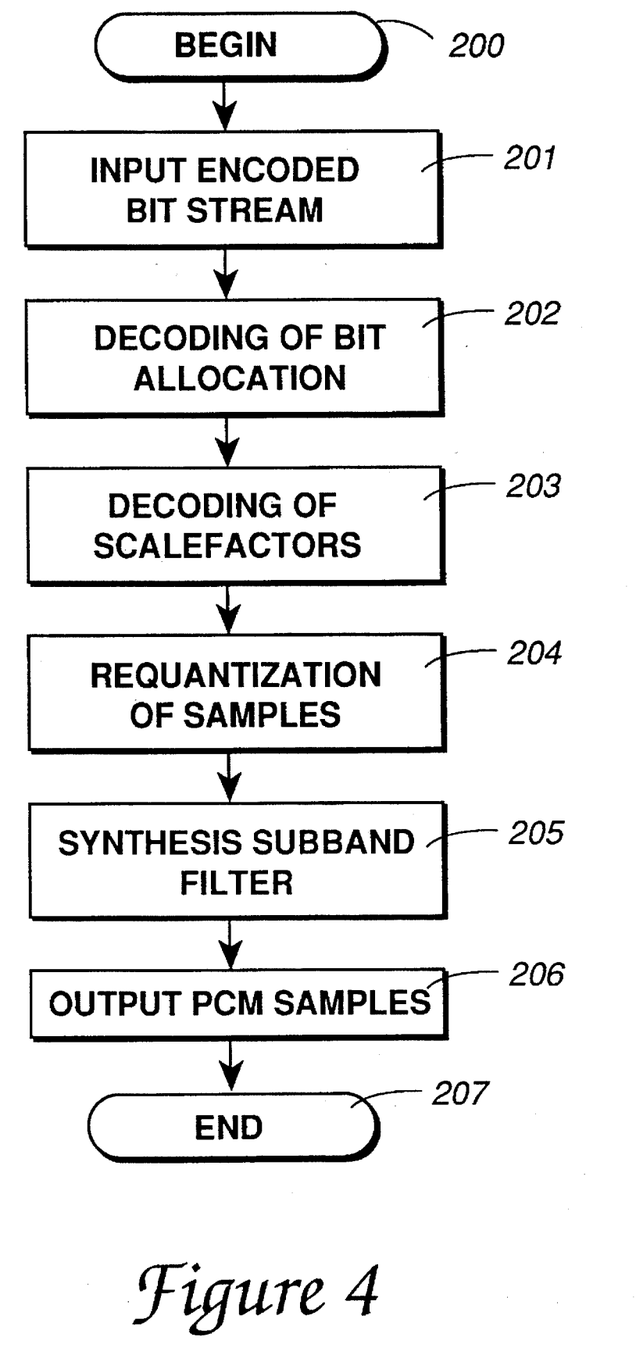
FIG. 4 is a flow diagram showing signal processing in layers I and II in an MPEG audio decoder.

FIG. 4 is a flow diagram showing signal processing in layers I and II in an MPEG audio decoder. The bit allocation of an input bitstream (200, 201) is decoded (202). Thereafter, various scale factors are also decoded (203) and the samples are requantized (204). The encoded signal is decoded in a synthesis subband filter (205) and the decoded pulse code modulated signals are output (206, 207) for further processing and/or real time reproduction.

The preferred embodiment of the invention is now discussed in greater detail.

MPEG Encoder

Figure 5:
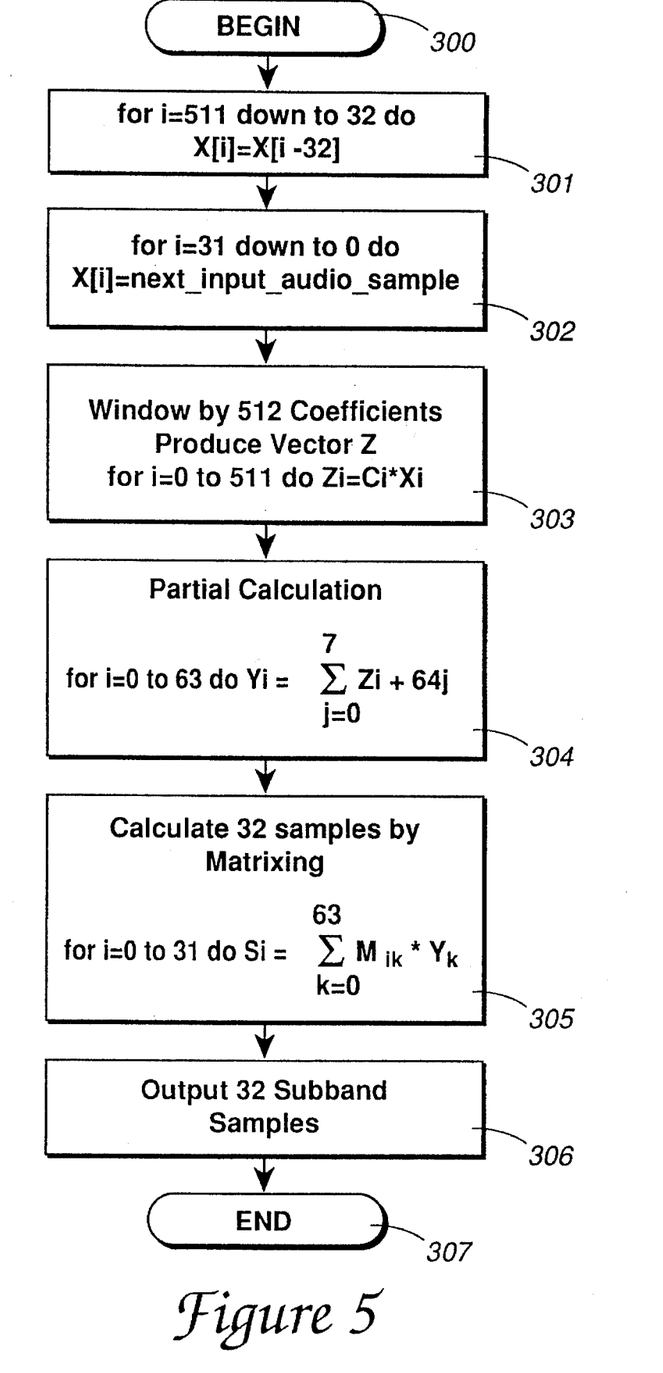
FIG. 5 is a flow diagram showing operation of an analysis subband filter for an MPEG audio encoder.

FIG. 5 is a flow diagram showing operation of an analysis subband filter (as identified by numeric designator 102 in FIG. 3) for an MPEG audio encoder. The figure shows the following major filter operations: shifting (data is shifted by 64 positions) (300, 301, 302); windowing (shifted data is multiplied by a window function and then added to generate output samples) (303); and matrixing (a 64×32 matrix-vector multiplication is performed) (305) to produce a decoded output signal (306, 307).

The matrixing operation in the MPEG audio encoding subband analysis filter (305) is defined as:

$$S(i) = \sum_{k=0}^{63} \cos\left[ \frac{\pi}{64} (2i+1)(k-16) \right] y(k), i=0,1,\ldots,31. \quad (1)$$

where the 64 y(k) samples are derived from the thirty-two input audio samples x(i) after various windowing, shift, and add operations are performed, as defined in the standard (302, 303, 304).

Given the input y(k), k=0,1,2, . . . 63, the matrixing operation in the subband analysis filter of the invention is as follows:

1. Form the data vector y'(k), k=0,1, . . . 63, where y'(k) is defined as $$y'(k) = \begin{cases} y(k+16) & k=0,1,\ldots,47 \\ -y(k-48) & k=48,49,\ldots,63 \end{cases} \quad (2)$$

then $$S(i) = \sum_{k=0}^{63} \cos\left[ \frac{\pi}{64} (2i+1)k \right] y'(k), i=0,1,\ldots,31. \quad (3)$$

2. Given y'(k) as defined in (2) above, form the data vector $$y''(0) = y'(0)$$

$$y''(k) = y'(k) - y'(64-k) \quad k=1,\ldots,31 \quad (4)$$

Then $$S(i) = \sum_{k=0}^{31} \cos\left[\frac{\pi}{64}(2i+1)k\right] y''(k). \quad i=0,1,\ldots,31. \quad (5)$$

Denote by X(i) the discrete cosine transform of a data sequence x(i), i=1,2, ..., N−1. Then X(i) is defined as:

$$X(i) = \frac{2}{N} e(i) \sum_{k=0}^{N-1} x(k)\cos\left[\frac{\pi}{2N}(2k+1)i\right], \quad i=0,1,\ldots N-1, \quad (6)$$

and the IDCT of X(i) is given by:

$$x(i) = \sum_{k=0}^{N-1} e(k)X(k)\cos\left[\frac{\pi}{2N}(2i+1)k\right], \quad i=0,1,\ldots N-1. \quad (7)$$

where $e(i) = 1/\sqrt{2}$ if i=0 and e(i)=1 otherwise.

As shown, equation (5) above requires 32×32 multiply accumulations. Comparing equation (5) above with equation (7), the S(i) corresponds (within a scale factor) to the 32-point inverse discrete cosine transform ("IDCT") of y''(k). Therefore, in the subband filter of the present invention, the output S(i) of the MPEG encoder matrixing operation is derived from the 32-point IDCT of y''(i).

By combining the definitions in equations (2) and (4) above, a direct relationship between Y''(k) and y(k) can be derived as follows:

$$y''(k) = \begin{cases} y(16) & k=0 \\ y(k+16)+y(16-k) & k=1,2,\ldots,16, \\ y(k+16)-y(80-k) & k=17,18,\ldots,31. \end{cases} \quad (8)$$

MPEG Decoder

Figure 6:
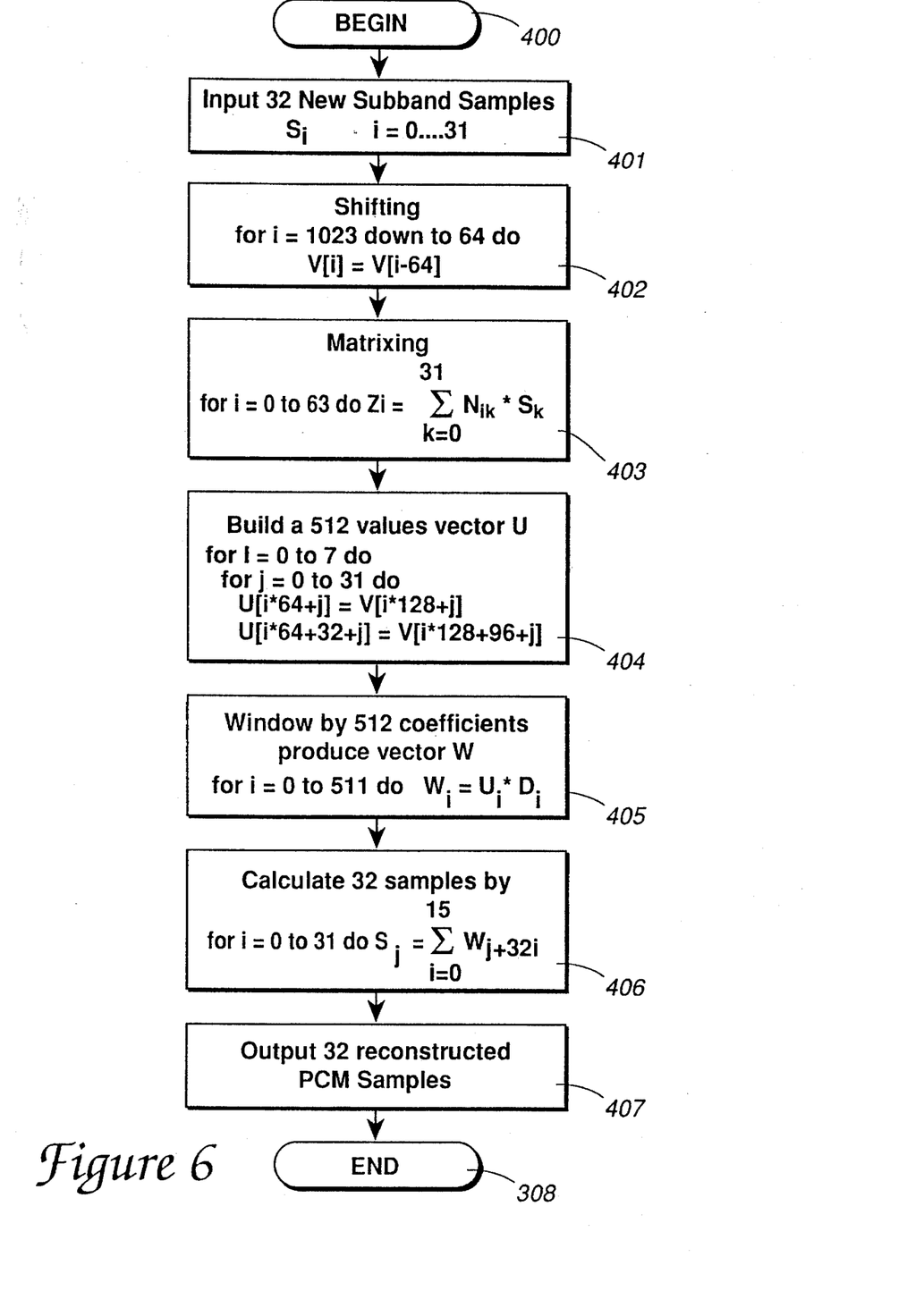
FIG. 6 is a flow diagram showing operation of a synthesis subband filter for an MPEG audio decoder.

FIG. 6 is a flow diagram showing operation of a synthesis subband filter for an MPEG audio decoder. As shown in FIG. 4, the MPEG audio decoding process (layer I and II) includes the following functions: synchronization, degrouping, dequantization, denormalization, and subband synthesis (as indicated in FIG. 4 by numeric designator 205). In FIG. 6, thirty-two subband samples are input to the decoder (400, 401) and, after a shifting operation (402), a matrixing operation is performed (403, 404). After a windowing operation (405) the thirty-two decoded samples are calculated (406) and the reconstructed pulse code modulated signal is output (407, 408).

In MPEG audio decoding, the matrixing operation in the subband synthesis filter (as indicated in FIG. 6 by numeric designator 403) is defined as:

$$V(i) = \sum_{k=0}^{31} \cos\left[\frac{\pi}{64}(2k+1)((i+16))\right] S(k), \quad i=0,1,\ldots,63. \quad (9)$$

Brute force evaluation of equation (9) above requires 32×64=2048 multiply-accumulate operations. Performance profiling for MPEG audio decoding shows that the matrixing operation represents about 40% of the overall decoding time. In the subband synthesis filter of the present invention, the matrixing operation allows decoding by implementing equation (9) above using a 32-point DCT.

The matrixing operation of the subband synthesis filter in the present invention operates as follows:

Given V(i) from equation (9), V'(i) may be defined as follows:

$$V'(i) = \begin{cases} V(i+48) & i=0,1,\ldots,15 \\ V(i-16) & i=16,17,\ldots,63. \end{cases} \quad (10)$$

From equations (9) and (10) above, the following are obtained:

$$V'(i) = \sum_{k=0}^{31} \cos\left[\frac{\pi}{64}(2k+1)(i+64)\right] S(k), \quad i=0,1,\ldots,15 \quad (11)$$

$$V'(i) = \sum_{k=0}^{31} \cos\left[\frac{\pi}{64}(2k+1)i\right] S(k), \quad i=16,17,\ldots,63. \quad (12)$$

$$V'(32) = \sum_{k=0}^{31} \cos\left[\frac{\pi}{2}(2k+1)\right] S(k) = 0. \quad (13)$$

For V' as defined above, V'(32+j)=−V'(32−j), for j=1,2,...16, and V'(32+1)=V'(32−j), for j=17,18, ..., 31.

If V'' is defined as: V''(i)=−V'(i), for i= 0,1, ..., 15, and V''(i)=V'(i), for i=16, 17, ..., 31. Then, $$V''(i) = \sum_{k=0}^{31} \cos\left[\frac{\pi}{64}(2k+1)i\right] S(k), \quad i=0,1,\ldots,31. \quad (14)$$

From equations (6) and (14) above, V''(i) corresponds (within a scale factor) to the 32-point discrete cosine transform of S(i). From V''(i), the desired vector V(i) is determined as follows:

For i=0 to 15

$$V(i) = V''(i+16), V(32-i) = -V(i) \quad (15)$$

V(16)=0 and for i=1 to 15

$$V(48-i) = -V''(i), V(48+i) = -V''(i), V(48) = -V''(0) \quad (16)$$

The output V of the matrixing operation equation (9) above in MPEG audio decoding is therefore obtained after post-processing from the DCT transform of S.

Figure 7:
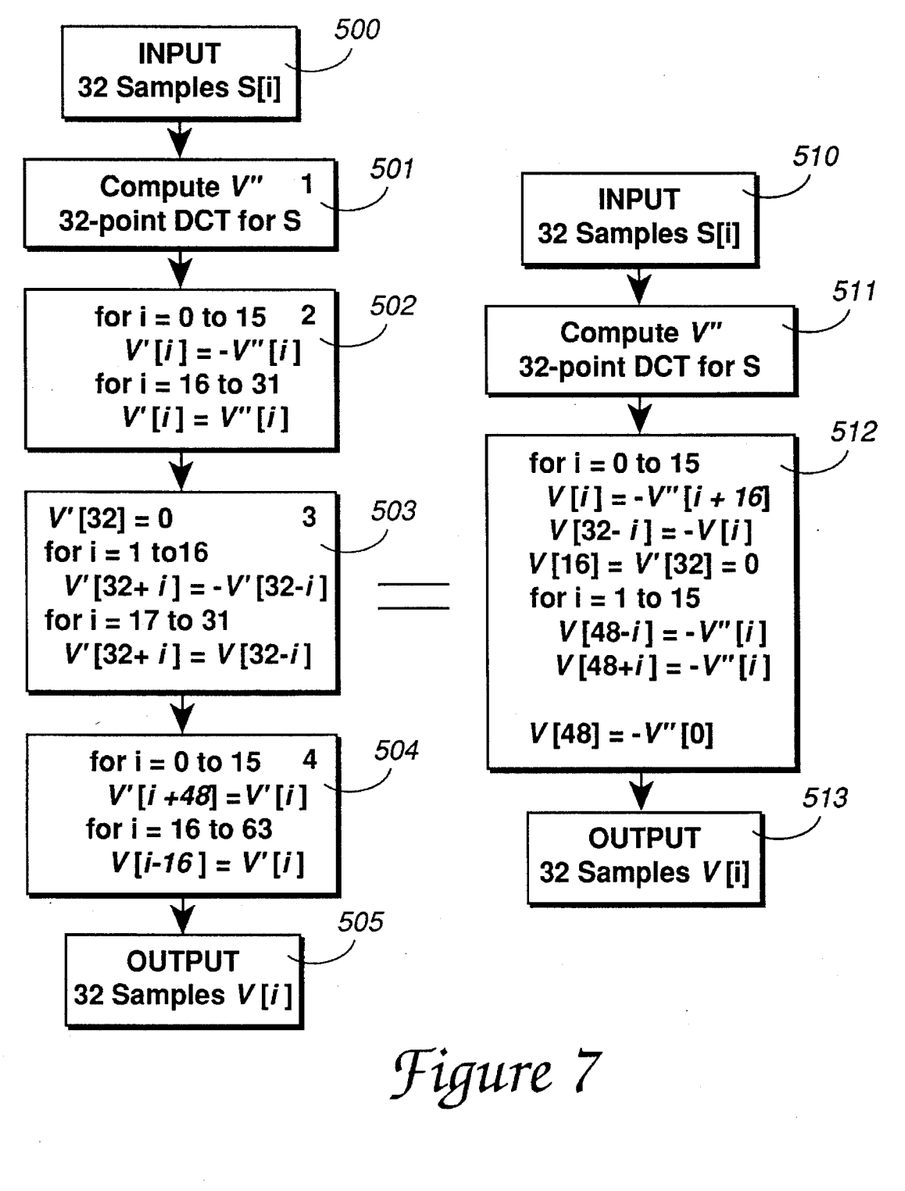
FIG. 7 is a flow diagram of a DCT-based matrixing operation in a synthesis subband filter for an audio MPEG decoder according to the present invention.

FIG. 7 is a flow diagram of a DCT-based matrixing operation in a synthesis subband filter for an audio MPEG decoder according to the present invention. Thus, thirty-two samples are input to the decoder (500; 510) and V'' is computed from the 32-point DCT of S (501; 510). The right side of the figure shows that Steps 2 to 4 (502, 503, 504) on the left side of the figure can be combined into one step (512), such that V can be computed directly from V''. Thereafter, a decoded pulse code modulated signal is output by the decoder (505; 513).

The invention allows more effective MPEG audio coding, in part by providing faster execution of the matrixing operations during subband filtering using either DCT for decoding or IDCT for encoding. Additionally, the invention reduces system memory requirements by operating on a reduced set of cosine coefficients.

Many techniques are known for implementing the computation of an IDCT and a DCT (see K. R. Rao, P. Yip, *Discrete Cosine Transform*, Academic Press, 1990). For example, Lee's fast DCT operation is recursive and may be applied to a 32-point DCT (or IDCT), resulting in a total of 80 multiplication and 209 addition operations (B. G. Lee, *A New Algorithm To Compute The Discrete Cosine Transform*, IEEE Trans. on ASSP, Vol. ASSP-32, No. 6, pp. 1243–1245, Dec. 1984). This represents a considerable computational savings compared to brute-force evaluation, as used in the prior art.

Lee's algorithm is used in the preferred embodiment of the invention because it is both efficient and simple to understand and code. A 32-point implementation of the fast DCT based on Lee's algorithm is now described.

Denote by X(i) the DCT data sequence x(i), i=0,1, ..., N−1. For N=32, the equations for the fast DCT are given by $$G(n) = X(2n), n = 0, 1, \ldots, 15. \quad (17)$$

$$H(n) = X(2n + 1) + X(2n - 1), n = 0, 1, \ldots, 15. \quad (18)$$

$$x(k) = g(k) + \frac{1}{2c_{64}^{2k+1}} h(k) \quad (19)$$

$$x(31 - k) = g(k) - \frac{1}{2c_{64}^{2k+1}} h(k), k = 0, 1, \ldots 15, \quad (20)$$

where $$c_{2N}^{(2k+1)n} = \cos(\pi(2k + 1)n/2N). \quad (21)$$

Figure 8:
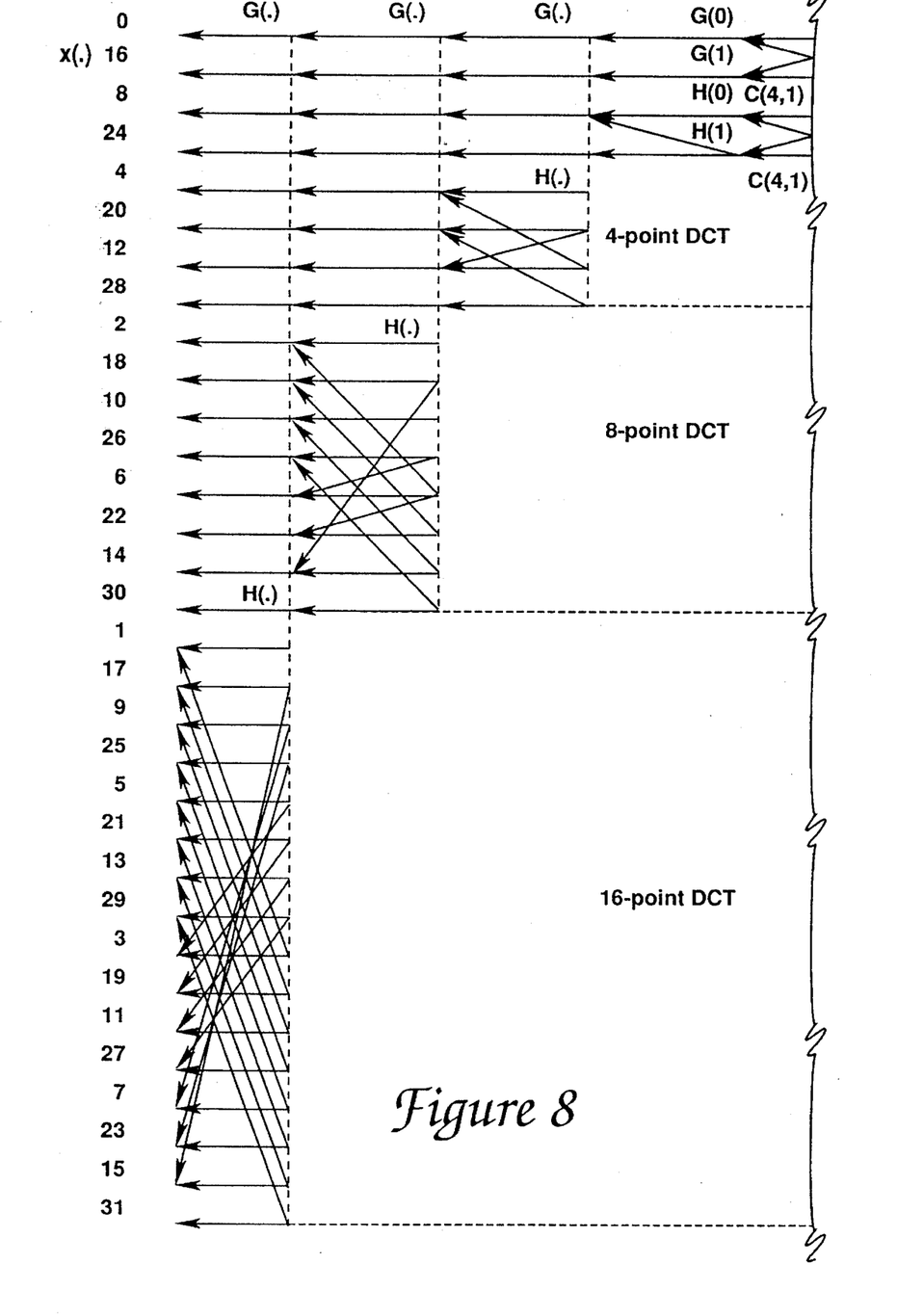
FIG. 8 is a data flow diagram for a 32-point fast DCT and IDCT operation according to the present invention.

FIG. 10 is a data flow diagram for a 32-point fast DCT operation according to Lee's algorithm, as implemented by the present invention. Equations (17) through (20) form the first and the last stages of the flow graph shown on FIG. 8 (with arrows reversed). The H, G, g, and h values in the figure are computed recursively using similar equations for the 16, 8, 4, and 2-point DCT operations. To compute the IDCT for MPEG encoding, the processing direction shown in the figure is reversed. In FIG. 8

$$C(2N,k) = 1/(2c_{2N}^k). \quad (22)$$

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A method for encoding an audio signal, comprising the steps of:

digitizing an audio source signal;

subband analysis filtering said digitized source signal, said subband analysis filtering step comprising:
 inputting said digitized source signal;
 windowing said input digitized source material;
 matrixing to generate an output signal by using an inverse discrete cosine transform operation to produce a resulting set of coefficients, said matrixing step including:
  forming a data vector y"(k), k=0, 1 ... 31, where y"(k) is defined as:

$$y''(k) = \begin{cases} y(16) & k = 0 \\ y(k+16) + y(16-k) & k = 1, 2, \ldots, 16, \\ y(k+16) - y(80-k) & k = 17, 18, \ldots, 31 \end{cases}$$

and;
 performing an inverse discrete cosine transform of y"(k)

$$S(i) = \sum_{k=0}^{31} \cos\left[\frac{\pi}{64} (2i+1)k\right] y''(k). i = 0, 1, \ldots, 31;$$

normalizing said output S(i) with selected scale factors; quantizing and entropy coding said coefficients; and multiplexing said coefficients to produce an encoded bit stream; wherein the output of the matrixing operation S(i) is derived from the 32-point inverse discrete cosine transform of y"(i).

2. The method of claim 1, wherein said audio signal is encoded in accordance with the MPEG audio standard.

3. A method for decoding an audio signal, comprising the steps of:

unpacking a data frame containing an encoded digitized source signal;

subband synthesis filtering said digitized source signal, said subband synthesis filtering step comprising:
 shifting said digitized source signal;
 matrixing to generate an output signal V(i) by performing a discrete cosine transform V" of S(k) where V" is defined as:

$$V''(i) = \sum_{k=0}^{31} \cos\left[\frac{\pi}{64} (2k+1)i\right] S(k), i = 0, 1, \ldots, 31.$$

determining the data vector V(i) as follows:
for i=0 to 15

$$V(i)=V''(i+16), V(32-i)=-V(i), V(16)=0, V(48)=-V''(0)$$

and for i=1 to 15

$$V(48-i)=-V(i)\ V(48+i)=-V''(i)$$

and;
 windowing said output V(i) to generate reconstructed samples;
 wherein the output V(i) of the matrixing operation is derived from the 32-point discrete cosine transform V"(i) of S(i)

4. The method of claim 3, wherein said audio signal is decoded in accordance with the MPEG audio standard.

5. An apparatus for encoding an audio signal, comprising:

an analog-to-digital converter for digitizing an audio source signal;

a subband analysis filter to produce a resulting set of samples; said subband analysis filter including:
 means for windowing said input digitized source material to generate output samples; and
 means for matrixing to generate an output signal, said matrixing means including:
  means for forming a data vector y"(k), k=0,1, ... 31, where y"(k) is defined as:

$$y''(k) = \begin{cases} y(16) & k = 0 \\ y(k+16) + y(16-k) & k = 1, 2, \ldots, 16, \\ y(k+16) - y(80-k) & k = 17, 18, \ldots, 31 \end{cases}$$

and;
 means for performing an inverse discrete cosine transform of y"(k)

$$S(i) = \sum_{k=0}^{31} \cos\left[\frac{\pi}{64} (2i+1)k\right] y''(k). i = 0, 1, \ldots, 31;$$

means for normalizing said coefficients with selected scale factors;
means for quantizing and entropy coding said coefficients; and
a multiplexer for combining said coefficients to produce an encoded output bit stream;
wherein the output S(i) of the matrixing operation is derived from the 32-point inverse discrete cosine transform of y"(i).

6. The apparatus of claim 5, wherein said audio signal is encoded in accordance with the MPEG audio standard.

7. An apparatus for decoding an audio signal, comprising:

means for unpacking a data frame containing an encoded digitized source signal;

a subband synthesis filter, said subband synthesis filter including:

means for performing a discrete cosine transform V" of S(i) where V" is defined as:

$$V"(i) = \sum_{k=0}^{31} \cos\left[\frac{\pi}{64}(2k+1)i\right] S(k), i = 0, 1, \ldots, 31.$$

and;

means for determining a data vector V(i) as follows:
for i=0 to 15

$V(i)32\ V"(i+16), V(32-i)=-V(i), V(16)=0 V(48)=-V"(0)$ and for i=1 to 15

$V(48-i)=-V"(i)$ and $V(48+i)=-V"(i);$ and a multiplexer for combining said samples to produce a decoded bit stream;

wherein the output V(i) of the matrixing operation is derived from the 32-point discrete cosine transform V"i) of S(i).

8. The apparatus of claim 7, wherein said audio signal is decoded in accordance with the MPEG audio standard.

* * * * *

UNITED STATES PATENT AND TRADEMARK OFFICE
CERTIFICATE OF CORRECTION

PATENT NO.    : 5,508,949
DATED         : April 16, 1996
INVENTOR(S)   : Konstantinos Konstantinides It is certified that error appears in the above-identified patent and that said Letters Patent is hereby corrected as shown below:

Column 9,
Line 11, delete "V(i)32 V" (i+16), V(32-i)= -V(i), V(16)=0V(48)=-V"(0)" and insert therefor -- V(i)=V"(i+16), V(32-i)=-V(i), V(16)=0, V(48)=-V"(0) --

Column 10,
Line 9, delete " V"i) and insert therefor -- V"(i) --

Signed and Sealed this

Twenty-ninth Day of October, 2002

Attest:

JAMES E. ROGAN
Attesting Officer            Director of the United States Patent and Trademark Office